J. J. BUCKLEY.
ROTATABLE TRUCK FOR FLAGSTAFFS.
APPLICATION FILED JUNE 26, 1912.
1,061,041.
Patented May 6, 1913.
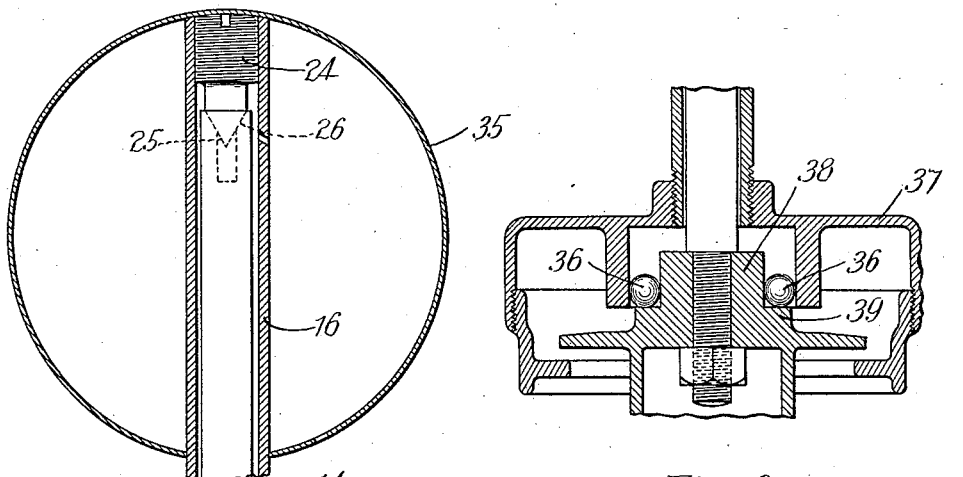
Fig. 3.
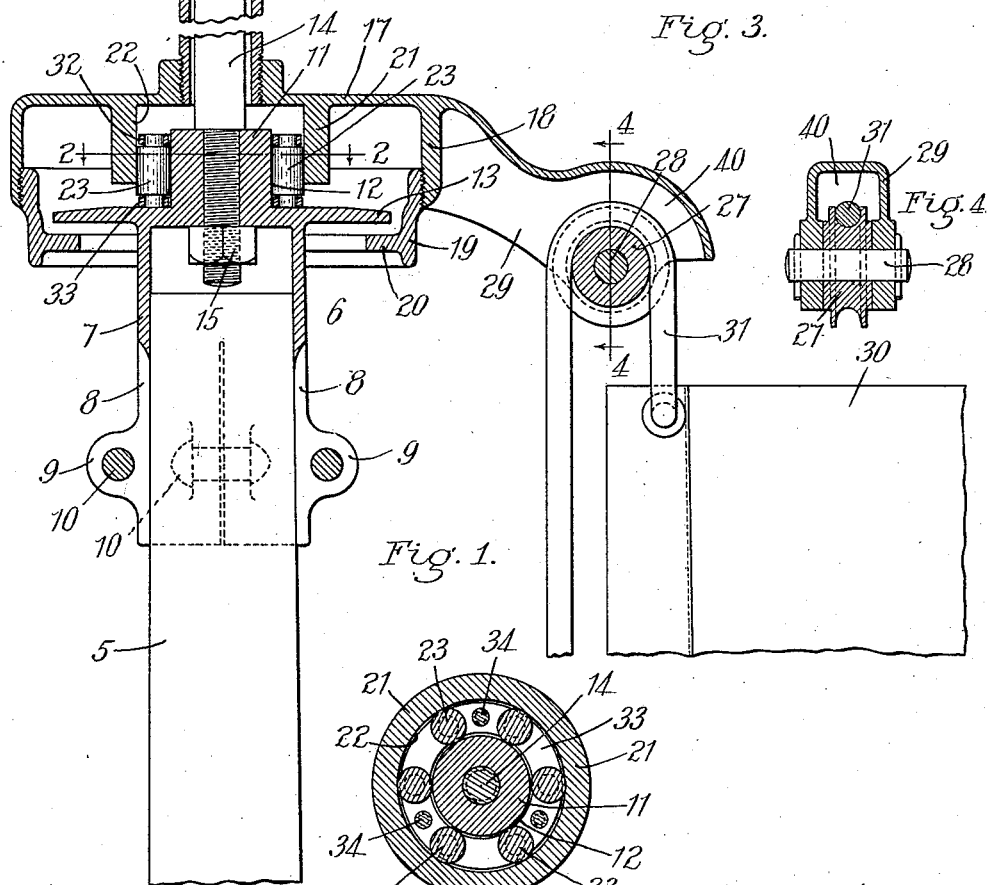
Fig. 1.
Fig. 2.
Fig. 4.
Witnesses.
Franklin E. Low.
Leonard A. Powell.
Inventor:
John J. Buckley,
by his attorney
Charles N. Gooding.

UNITED STATES PATENT OFFICE.

JOHN J. BUCKLEY, OF LYNN, MASSACHUSETTS, ASSIGNOR TO BUCKLEY AUTOMATIC FLAG-POLE COMPANY, A CORPORATION OF MASSACHUSETTS.

ROTATABLE TRUCK FOR FLAGSTAFFS.

1,061,041.  Specification of Letters Patent.  Patented May 6, 1913.

Application filed June 26, 1912. Serial No. 705,919.

*To all whom it may concern:*

Be it known that I, JOHN J. BUCKLEY, a citizen of the United States, residing at Lynn, in the county of Essex and State of Massachusetts, have invented new and useful Improvements in Rotatable Trucks for Flagstaffs, of which the following is a specification.

This invention relates to an improved rotary truck or bearing particularly adapted to be used at the upper end of a flagstaff or pole for supporting a flag, pennant or signal apparatus and its halyards.

The object of the invention is to provide a device which is strong and durable, which rotates readily and with very little friction and which is so constructed that the interior mechanism thereof is thoroughly protected from the weather.

The object of the invention is also to provide a device of the character set forth in which the bearing is provided with anti-frictional devices both to take the end thrust and the lateral thrust which may be brought to bear upon the parts thereof, either from the weight of the flag and its halyards or from the pull sidewise upon the bearing caused by the pressure of the wind upon said flag or pennant.

The invention consists in the combination and arrangement of parts set forth in the following specification and particularly pointed out in the claims thereof.

Referring to the drawings: Figure 1 is a vertical sectional elevation illustrating my improved rotatable truck, the same being shown fastened at the top of a flag pole and the flag pole being broken away to save space in the drawings, the upper portion of the device being also broken away to save space in the drawings. Fig. 2 is a plan section taken on line 2—2 of Fig. 1. Fig. 3 is a vertical section through an annular bearing similar to that illustrated in Fig. 1, but showing the same adapted to employ a series of balls instead of a series of rollers such as illustrated in Fig. 1. Fig. 4 is a detail section taken on line 4—4 of Fig. 1.

Like numerals refer to like parts throughout the several views of the drawings.

In the drawings, referring to Figs. 1 and 2, 5 is a flagstaff and 6 is a cap fast to the upper end thereof. Said cap 6 consists of a hollow sleeve 7 adapted to fit closely around the upper end of the pole 5 and split by slots 8, 8 extending upwardly from the lower end of said sleeve for a portion of the length thereof. The sleeve 7 is provided with ears 9, 9 located in pairs and arranged on opposite sides of the slits 8, 8, said ears being drawn toward each other by bolts or screws 10, 10 to clamp the cap 6 firmly to the upper end of the pole 5. The cap 6 terminates at its upper end in a cylindrical hub 11, the periphery of said hub constituting a roller race 12. An annular flange 13 projects outwardly from the upper end of the sleeve 7 and a spindle 14 has screw-threaded engagement with the hub 11 and is locked thereto by a nut 15. The spindle 14 extends upwardly from the hub 11 and is surrounded by a sleeve 16 to the lower end of which is fastened, preferably by screw-threaded engagement, an annular member 17 having a downwardly projecting annular flange 18 which constitutes a drip flange. A ring 19 has screw-threaded engagement with the interior of the annular flange 18 and said ring has an inwardly projecting flange 20 which projects beneath the flange 13. Thus any rain or snow will be prevented by the flanges 18, 19 and 20, together with the flange 13, from entering the interior of the annular casing 17, and interfering with the working of the mechanism. An annular flange 21 is contained within the casing 17 and projects downwardly from the top of said casing, providing on its inner face a roller race 22. A series of rollers 23 are interposed between the inner member of the annular bearing, viz., the hub 11 and the outer member of said annular bearing, viz., the casing 17, and these rollers bear against the roller races 12 and 22, thus preventing any lateral movement of the casing 17 relatively to the hub 11 of the cap 6. As a matter of convenience in assembling and to keep the rolls equally spaced apart, they are journaled at their opposite ends in rings 32 and 33, said rings being fastened together by pins 34 riveted at their opposite ends to said rings. A screw 24 has screw-threaded engagement with the upper end of the sleeve 16 and terminates at its lower end in a conical point 25, constituting a pivot, which projects into a like recess 26 formed in the upper end of the spindle 14. A sheave 27 is journaled on a pin 28 fast to an arm 29. The arm 29 has a chamber 40 provided therein within which the sheave 27 is located whereby said sheave is protected from the weather. It will be noted that the sheave 27 is mounted on the outer end of the arm 29 and that said arm is of such a length as to cause said sheave to be located at a substantial distance from the pole 5. The object of placing the sheave at a substantial distance from the pole is so that the flag 30 may be exposed to the action of the wind whereby it is held extended without the pole 5 interfering with said action of the wind to any material extent. Another object of locating the sheave at a substantial distance from the center of the pole 5 is that the pull of the halyards and flag when exposed to the wind, tending to rotate the casing 17, is rendered more effective and given greater power over the resistance of said casing to rotation caused by friction. A plurality of these arms and sheaves may be applied to the casing if it is desired to float a number of flags or pennants from the same staff. The flag 30 is attached to halyards 31 in the usual manner, the halyards running around the sheave 27. If desired, an ornamental ball 35, preferably of sheet metal, may be fastened to the sleeve 16.

The general operation of the device hereinbefore specifically described is as follows: The weight of the casing 17, ring 19, halyards 31 and flag 30 is supported upon the pivot 24 in the pivotal bearing 26 at the upper end of the spindle 14 and the larger part of the lateral strain is taken by the roller bearing consisting of the casing 17, the hub 11 and the rollers 23 interposed between said casing and hub. The construction of the device is such that while the same is held firmly against downward or lateral pressure, still it is very easily rotated and accommodates itself to varying wind pressures almost instantaneously.

In Fig. 3 I have illustrated a modified form of my invention in which the parts are substantially the same as in the form of my invention illustrated in Fig. 1, except that a series of balls 36 are interposed between the hollow casing 37 and the hub 38, said balls being supported upon a shoulder 39, the balls 36 performing the functions of the rollers 23 in the form of my invention illustrated in Figs. 1 and 2.

It will be understood that my improved truck for flagstaffs and the like may be used on the stationary flagpoles on buildings and the like or it may be used on the masts of vessels.

Having thus described my invention, what I claim and desire by Letters Patent to secure is:

1. A truck for flagstaffs and the like having, in combination, a cap adapted to be fastened to the top of a pole having an external race and constituting an inner member of an annular bearing, a spindle fast to said cap and projecting upwardly therefrom, a sleeve surrounding said spindle, a pivot on the upper end of said sleeve adapted to bear against the upper end of said spindle, an annular casing on the lower end of said sleeve constituting an outer member of said annular bearing and having an internal race, a series of rollers interposed between said races and means to connect flag halyards to said outer member.

2. A truck for flagstaffs and the like having, in combination, an annular bearing comprising one member adapted to be fastened to the top of a pole and constituting a cap therefor, another member consisting of an annular casing and a series of rollers interposed between said members to prevent the lateral movement of said members relatively to each other, a spindle fast to said cap member extending upwardly therefrom, a sleeve extending upwardly from said annular casing, a pivot on the upper end of said sleeve adapted to bear against the upper end of said spindle and means to connect flag halyards to said annular casing.

3. A truck for flagstaffs and the like having, in combination, an annular bearing comprising one member adapted to be fastened to the top of a pole and constituting a cap therefor, another member consisting of an annular casing and a series of rollers interposed between said members to prevent the lateral movement of said members relatively to each other, a spindle fast to said cap member extending upwardly therefrom, a sleeve extending upwardly from said annular casing, a pivot on the upper end of said sleeve adapted to bear against the upper end of said spindle and a sheave rotatably mounted on said annular casing.

4. A truck for flagstaffs and the like having, in combination, an annular bearing comprising one member consisting of a cap adapted to fit over the upper end of a pole and terminating at its upper end in a cylindrical hub, the periphery of said hub constituting a roller race and a spindle fast to and projecting upwardly from said hub, another member consisting of an annular casing having an interior roller race and a series of rollers interposed between said races to prevent lateral movement of said members relatively to each other, a sleeve extending upwardly from said annular casing, a pivot on the upper end of said sleeve adapted to bear against the upper end of said spindle and means to connect flag halyards to said annular casing.

5. A truck for flagstaffs and the like having, in combination, an annular bearing comprising one member consisting of a cap adapted to fit over the upper end of a pole, said cap split from its lower end upwardly for a portion of its length, means to clamp said split portion to said pole, said cap terminating at its upper end in a cylindrical hub, the periphery of said hub constituting a roller race and a spindle fast to and projecting upwardly from said hub, another member consisting of an annular casing having an interior roller race and a series of rollers interposed between said races to prevent lateral movement of said members relatively to each other, a sleeve extending upwardly from said annular casing, a pivot on the upper end of said sleeve adapted to bear against the upper end of said spindle and means to connect flag halyards to said annular casing.

6. A truck for flagstaffs and the like having, in combination, an annular bearing comprising one member consisting of a cap adapted to fit over the upper end of a pole and terminating at its upper end in a cylindrical hub, the periphery of said hub constituting a roller race, an external horizontal annular flange on said cap, a spindle fast to and projecting upwardly from said hub, another member consisting of an annular casing having an interior roller race and an external vertical annular flange and a series of rollers interposed between said races to prevent lateral movement of said members relatively to each other, a sleeve extending upwardly from said annular casing, a pivot on the upper end of said sleeve adapted to bear against the upper end of said spindle, a ring fast to the lower end of said external vertical annular flange with an annular flange thereon projecting inwardly therefrom beneath said horizontal annular flange and means to connect flag halyards to said annular casing.

In testimony whereof I have hereunto set my hand in presence of two subscribing witnesses.

JOHN J. BUCKLEY.

Witnesses:
CHARLES S. GOODING,
SYDNEY E. TAFT.

---

Copies of this patent may be obtained for five cents each, by addressing the "Commissioner of Patents, Washington, D. C."